Figure 1:
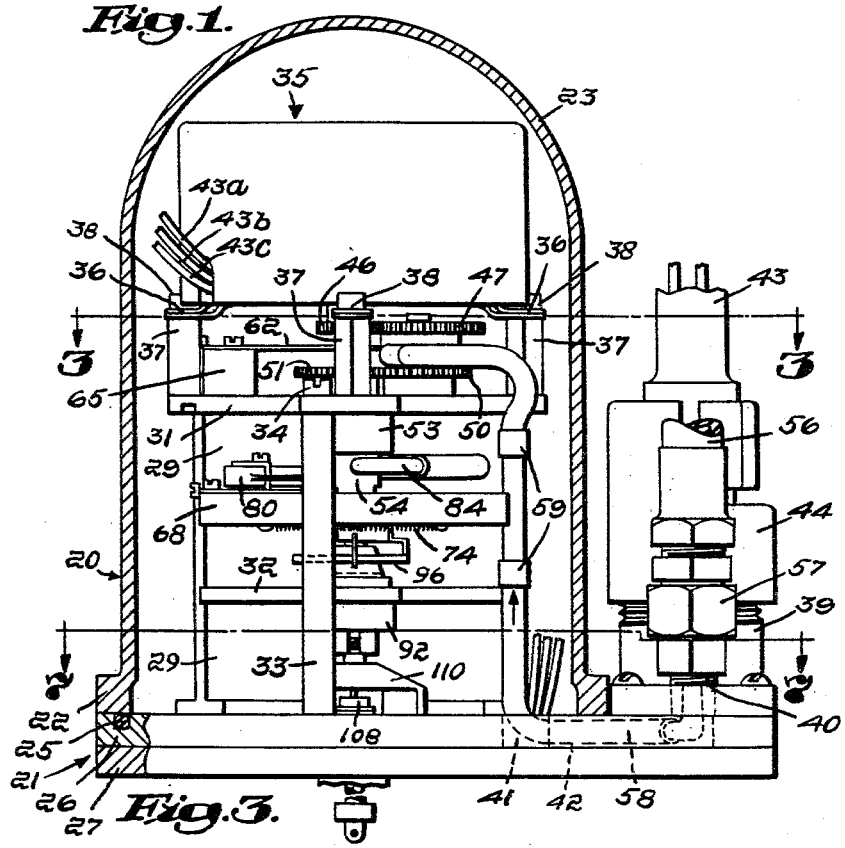

Feb. 16, 1965  W. B. BROOKFIELD  3,169,392

VISCOMETER

Original Filed April 26, 1960  7 Sheets-Sheet 1

Inventor:
William B. Brookfield
by Abbot Spear, Attorney

Feb. 16, 1965 W. B. BROOKFIELD 3,169,392
VISCOMETER
Original Filed April 26, 1960 7 Sheets-Sheet 2
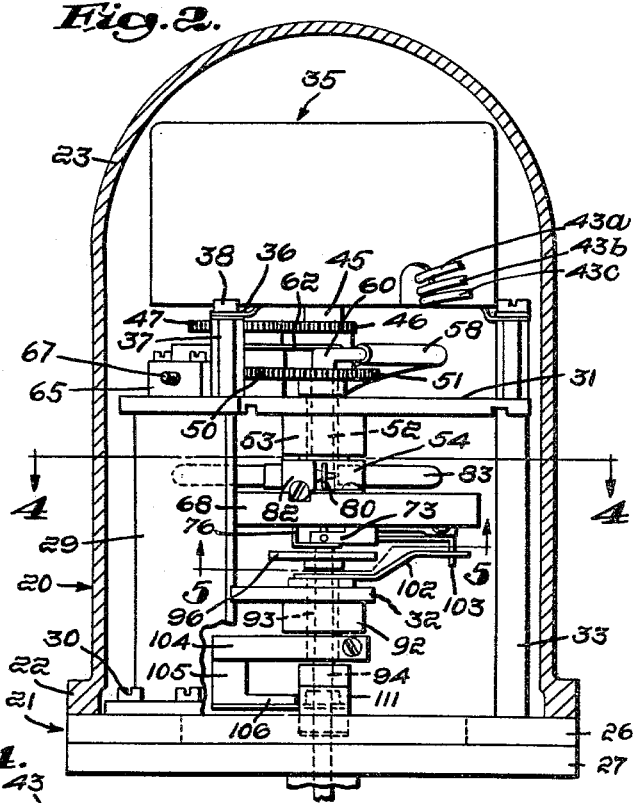
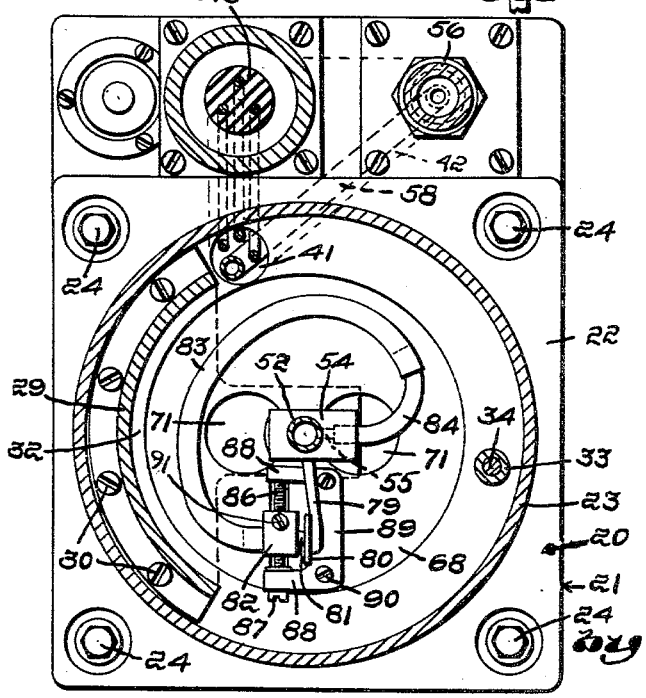
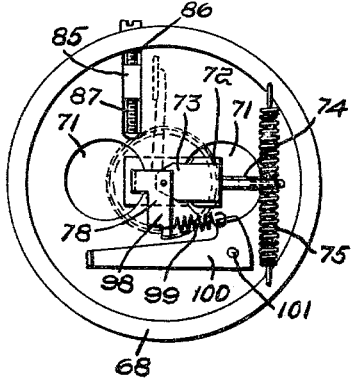
Inventor:
William B. Brookfield
Attorney

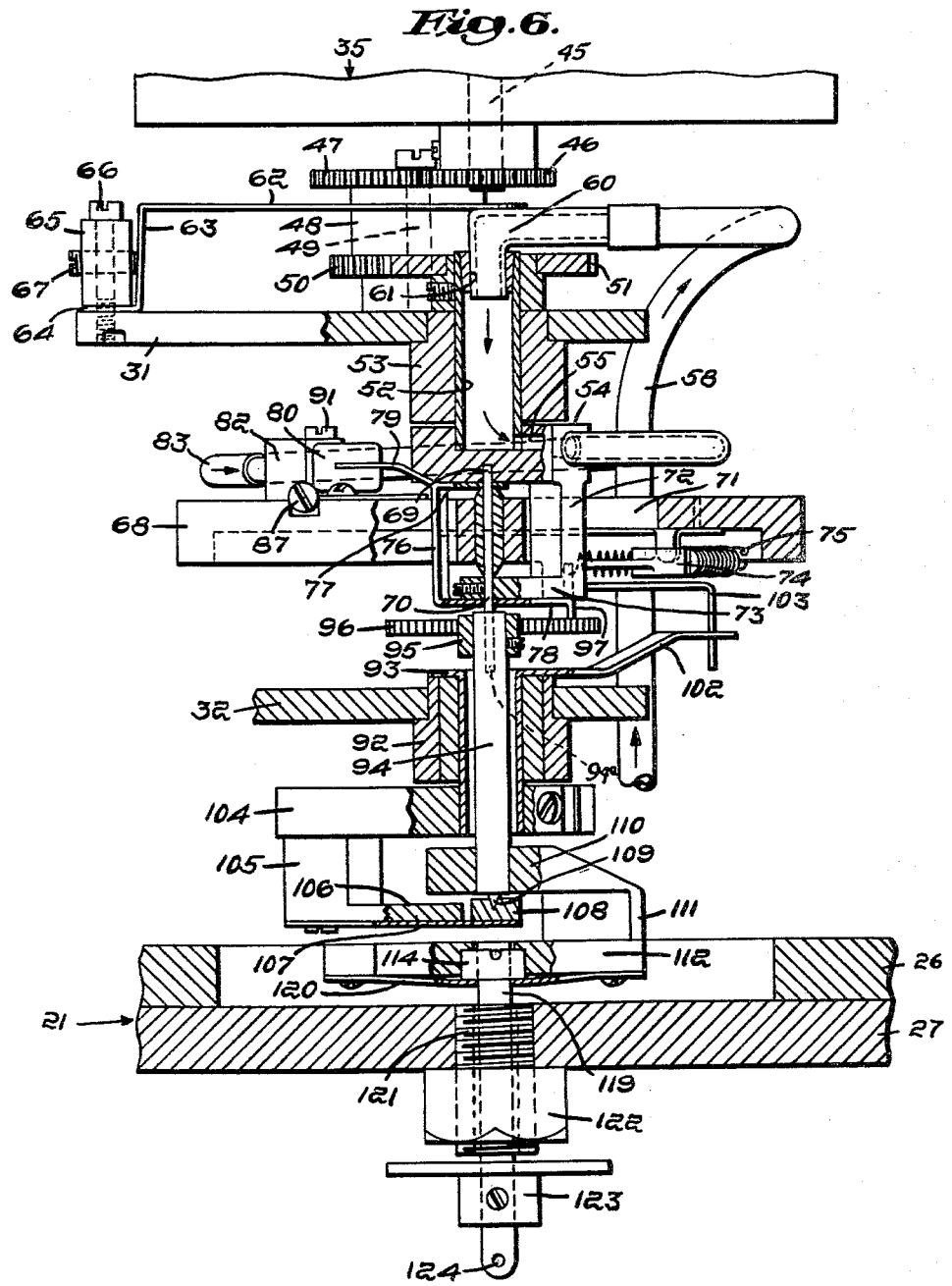

Feb. 16, 1965  W. B. BROOKFIELD  3,169,392
VISCOMETER
Original Filed April 26, 1960  7 Sheets-Sheet 4
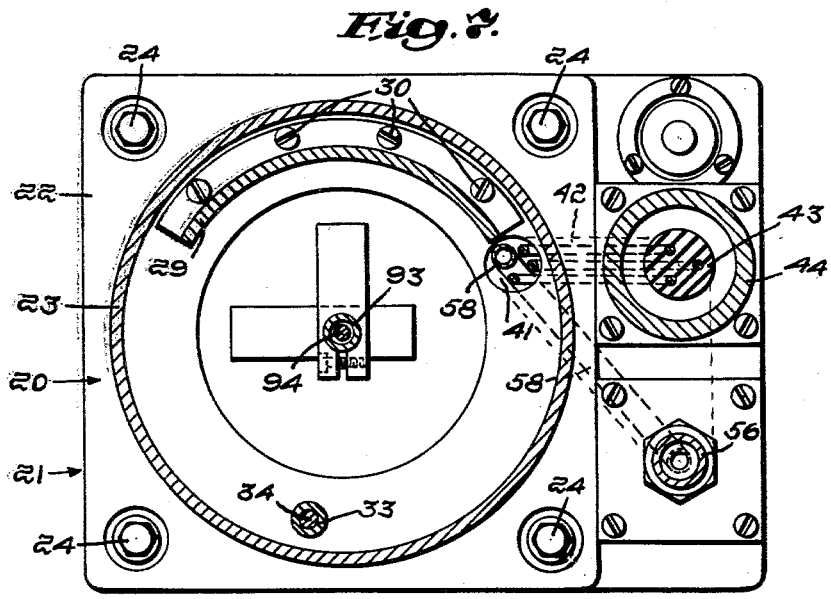
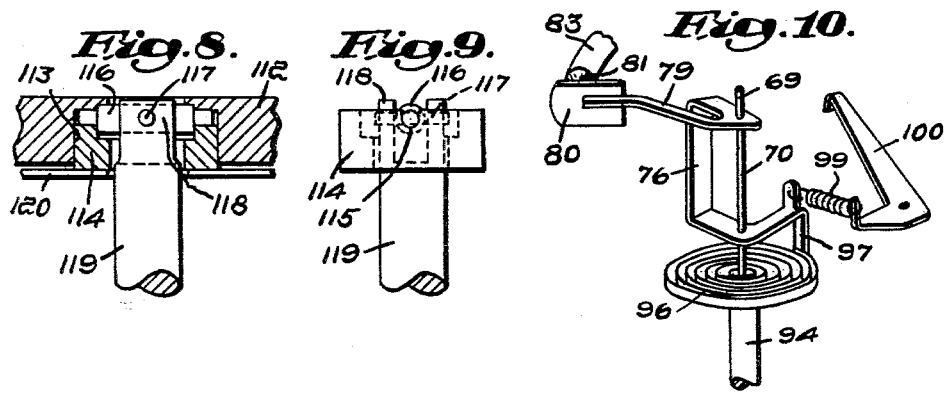
Inventor:
William B. Brookfield
by Allen Spear
Attorney

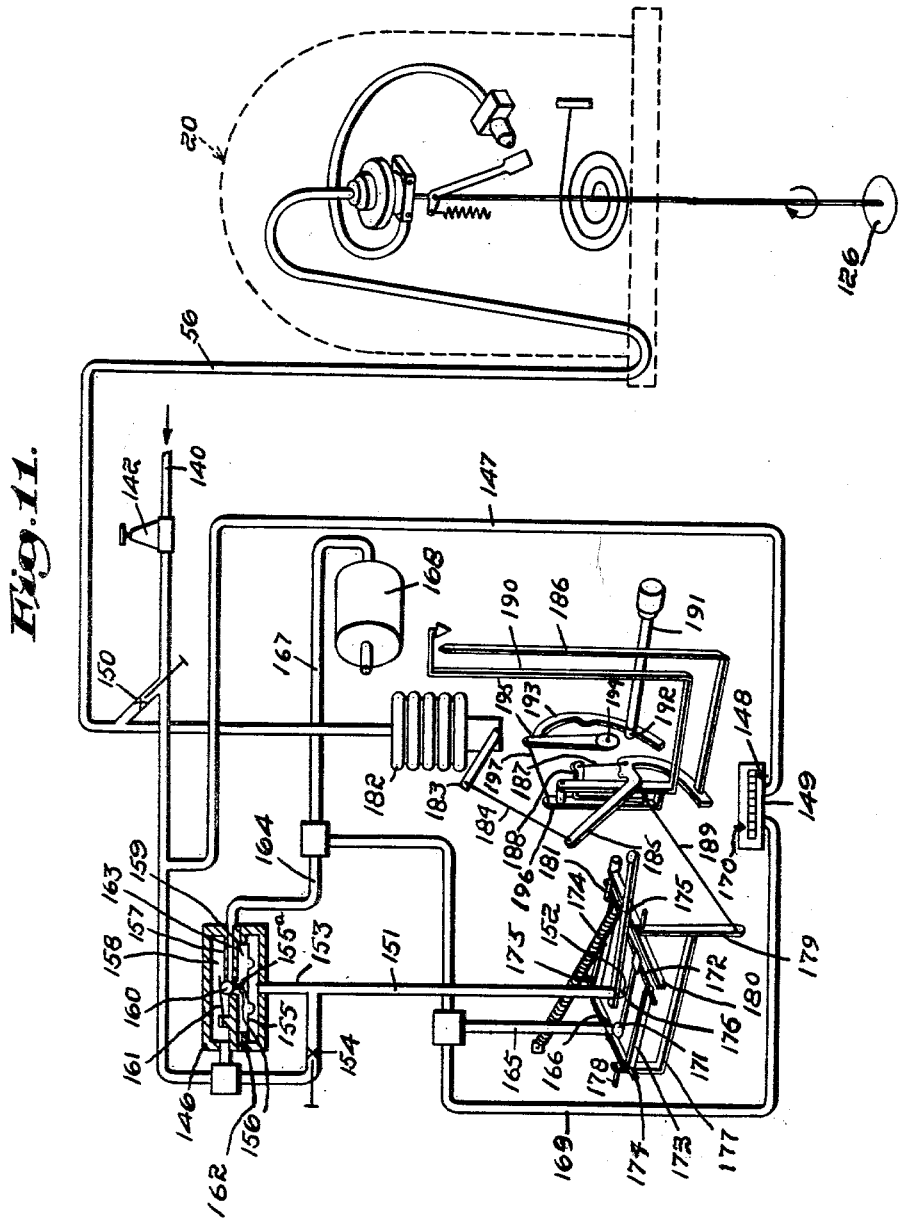

Fig.12.

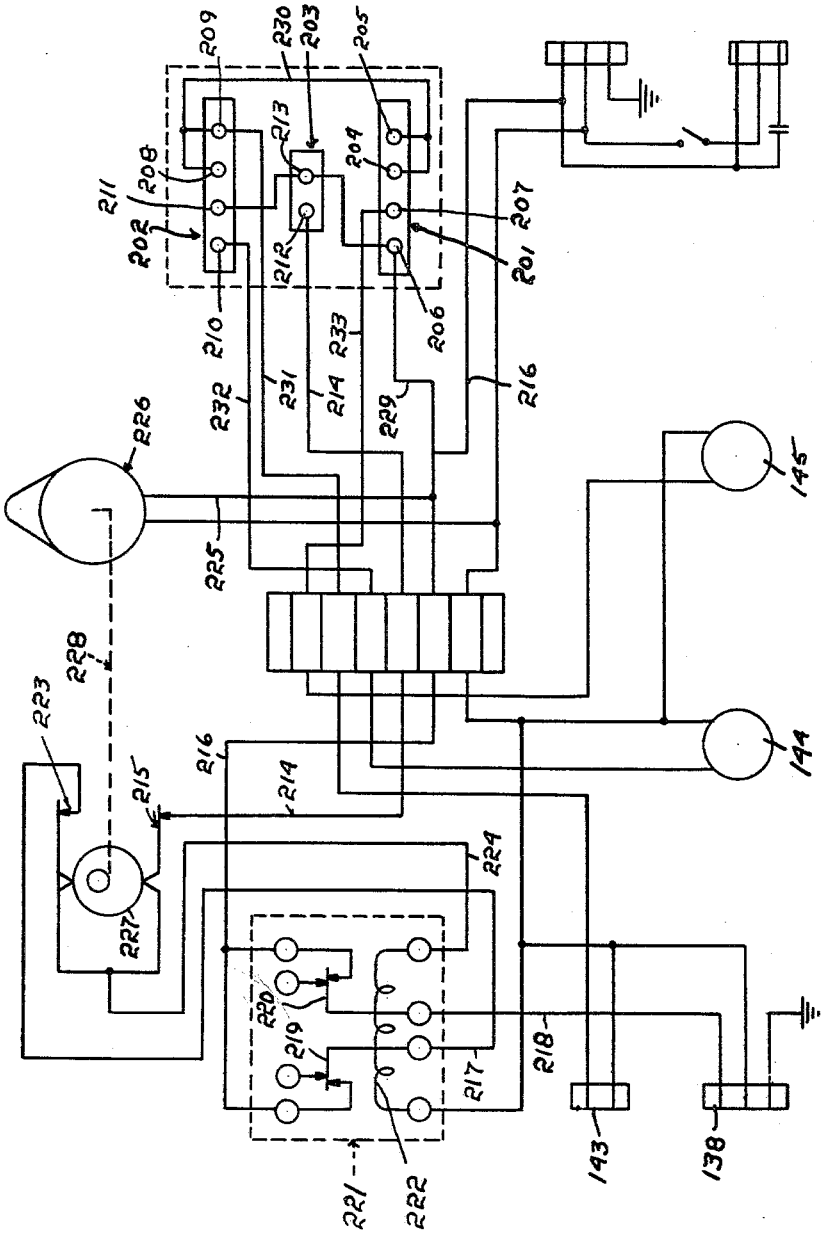

United States Patent Office
3,169,392
Patented Feb. 16, 1965

3,169,392
VISCOMETER
William B. Brookfield, 9 Osage Road, Canton, Mass.
Continuation of application Ser. No. 24,814, Apr. 26, 1960. This application Dec. 17, 1962, Ser. No. 245,637
19 Claims. (Cl. 73—59)

The present invention relates to viscometers and particularly to viscometers wherein the operation of the control means is effected by pneumatic signals generated in response to accurately detected viscosity changes of a small order. The present application is a continuation of my application, Serial No. 24,814, filed April 26, 1960, and now abandoned.

There are many instances where not only is the detection of viscosity changes but also the immediate correction thereof is highly important. Examples of such instances are to be found in the graphic arts where the quality of the work is adversely affected if the viscosity of the ink departs from a predetermined value. The term "ink," as used herein, means not only gravure and aniline inks but also varnishes and lacquers used in the graphic arts. It will be appreciated that the relation between solvent concentration and viscosity is such that small variations in the former are attended by large variations in the latter and that the higher the press speed the faster drying must be the solvents thus making the problems even more acute.

The principal objective of the present invention is to provide a viscometer that is capable of accurately sensing and effecting the correction of small viscosity changes efficiently, accurately, and reliably without the use of complex and delicate circuitry.

In accordance with the invention, this objective is attained by providing a viscometer having a motor driven flywheel provided with a member which has an outlet port to which air under pressure is delivered while the flywheel is rotating. A valve member for the outlet port is mounted to move into and out of a port closing position and is attached to a coil spring which constitutes the driving connection with a driven shaft and which is arranged and disposed for rotating the latter and to be partly wound, when the driven shaft torque exceeds a predetermined value, thus to swing the valve member out of its port closing position thereby to provide the basis for a pulse generation. A connection between the flywheel and the driven shaft becomes operative when the coil spring connection has become wound to a predetermined extent.

A viscometer, in accordance with the invention, is adjustable to respond to small increases in viscosity of the material and to pneumatically affect a controller so as to cause, through simple and reliable means, the operation of a valve thus to admit solvent until the viscometer senses that the desired small decrease in viscosity has been made to effect the needed correction of the system.

To carry out the above objectives, pressure operated means are provided to operate a control switch in a circuit, preferably intermittently opened, to a solenoid operated valve in the solvent supply line. These same means are also employed to actuate limit switches in circuits operable to actuate signals that indicate system failures whether on the high viscosity side, as when the solvent supply fails, or on the low viscosity side, as when the ink supply fails or an excess of solvent is present.

As the pressure variations attendant the operation of the viscometer are inherently small, the invention provides means whereby these small pressure changes are operative to control the pressure operated means accurately in response thereto on a basis that permits substantial pressures to be employed in the latter to ensure positive actuation of the control and limit switches by simple and rugged mechanisms.

In the accompanying drawings, there is shown an illustrative embodiment of the invention from which these and other of its objectives, novel features, and advantages will be readily apparent.

Figure 3:
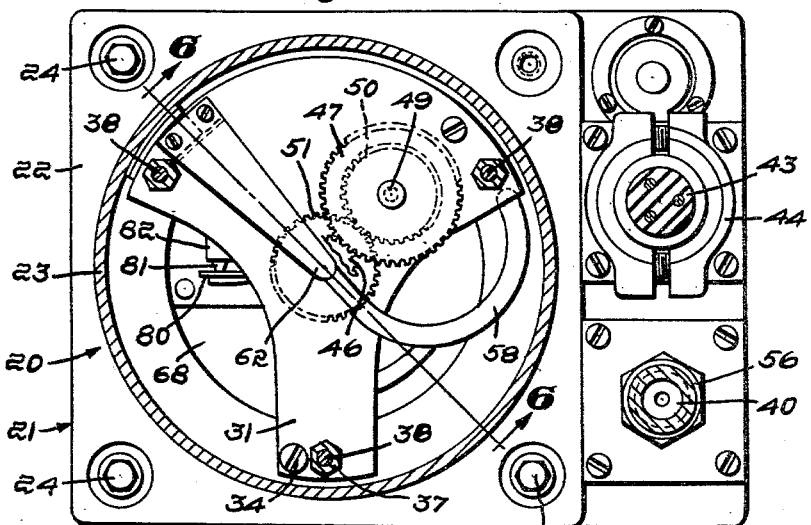

In the drawings:
FIGURE 1 is a side elevation of a viscometer in accordance with the invention with its housing shown in section;
FIGURE 2 is a similar view showing the viscometer as turned 90° from its FIGURE 1 position;
FIGURE 3 is a section taken approximately along the indicated lines 3—3 of FIGURE 1;
FIGURE 4 is a section taken approximately along the indicated lines 4—4 of FIGURE 2;
FIGURE 5 is a bottom view of the flywheel;
FIGURE 6 is a section, on an increased scale, taken approximately along the indicated lines 6—6 of FIGURE 3;
FIGURE 7 is a section taken approximately along the indicated lines 7—7 of FIGURE 1;
FIGURE 8 is a partly sectioned side view, on an increased scale, of a universal joint in the driven shaft;
FIGURE 9 is a side elevation of the joint showing it as turned 90° from its FIGURE 8 position;
FIGURE 10 is a perspective view of the flapper valve and coil spring connection with the driven shaft;
FIGURE 11 is a somewhat schematic view of a viscometer and the pneumatically actuated controller;
FIGURE 12 is a schematic illustration of a typical installation in accordance with the invention, and
FIGURE 13 is a view illustrating a typical electric circuit.

In the drawings, a viscometer, in accordance with the invention, is generally indicated at 20 and shown as having a base 21 to which the flange 22 of a housing 23 is clamped, as by screws 24, against an annular seal 25. The base 21 consists of upper and lower plates 26 and 27 locked together by units 28 establishing sockets for the screws 24.

A support 29 of arcuate section is attached as at 30 to the base 21 and includes vertically spaced, transversely disposed shelves 31 and 32. The shelf 31 is supported by a tubular post 33 and is anchored thereto by a screw 34 which extends through the post 33 and into the base 21.

A generally indicated motor 35 has flanges 36 supported by spacers 37 and anchored by screws 38 which extend through the spacer 37 and into the shelf 31. Exteriorly of the housing 23, the base has a pair of threaded ports 39 and 40 both of which are in communication with the port 41 in the base within the housing 23 (see FIGURES 4 and 7), through a channel 42 in one of the proximate faces of the base establishing plates. An electric cable 43 extends through the port 39 and is anchored by the clamp 44 threaded on the port 39. The cable leads 43ᵃ, 43ᵇ, and 43ᶜ extend upwardly through the port 41 around the support 29 and upwardly to the motor 35.

The drive shaft 45 of the motor 35 is provided with a gear 46 meshing with the larger gear 47 of the idler 48 mounted on the spindle 49 attached to the shelf 31. The smaller gear 50 of the idler meshes with a gear 51 fast on a hollow shaft 52 journalled in and extending through the hub 53 with which the shelf 31 is provided. At its lower end, the shaft 52 has a radially disposed arm 54 having a radial passage 55 in communication with the passage defined by the hollow shaft 52. A conduit 56 for air under pressure is attached to the port 39 by the threaded fitting 57 and a conduit 58 extends therefrom upwardly through the port 41 and is anchored to an edge of the support 29 as by clips 59. At its free end, and as may best be seen in FIGURE 6, the conduit 58 has a downwardly disposed nozzle 60 provided with an antifriction, tapered seal 61 entrant of the upper end of the hollow shaft 52 and resiliently seated therein by means of the leaf spring 62 having reversely bent portions 63 and 64. The portion 64 is clamped between the shelf 31 and a block 65 by screws 66 and is adjustably tensioned by the screw 67 extending transversely through the block 65 and into contact with the portion 63.

A flywheel 68 has, as may be seen in FIGURE 6, axial pivots 69 and 70 and diametrically arranged holes 71 through one of which freely extends a spacer 72 connecting the arm 54 to a radial arm 73 and defining a U-shaped connector. The arms 54 and 73 have seats for the flywheel pivots 69 and 70 which extend downwardly through the arm 73. The spacer 72 has a blade member 74 centrally entered between appropriate turns of a coiled spring 75 connected as a chord to the flywheel 68 thus to provide a yieldable, resilient connection therebetween and the drive shaft 52.

A second U-shaped connector 76 has upper and lower parallel arms 77 and 78 supported by the flywheel pivots 69 and 70, respectively, for rotation independently thereof. The arm 77 includes a radially disposed extension 79 provided with a flat head 80 movable into and out of a position in which it functions as a flapper valve to close the port 81 of an outlet member 82 to which one end of a flexible conduit 83 is connected. The other end of the conduit 83 is connected to the rigid, curved tubing 84 secured in the radial passage 55. The outlet member 82 includes a bottom part 85 (see FIGURE 5) slidably guided in a slot 86 in the flywheel 68 and has a screw 87 threaded therethrough. The screw 87 is held in place by the arms 88 of a clip 89 (see FIGURE 4), attached to the upper face of the flywheel 68 as by screws 90. A set screw 91 is provided to lock the outlet member 82 in position.

Journalled in a hub 92 in the shelf 32 is a hollow shaft 93 within which there is an independently rotatable driven shaft 94. The shaft 94 has a hub 95 to which the inner end of a spiral spring 96 is anchored. The outer end of the spring 96 is attached to the downturned lug 97 at the outer end of the lower arm 78 of the connector 76 which end is diametrically opposed to the flapper valve head 80. The spring 96 is the driving connection between the flywheel 68 and the driven shaft 94 and, if a predetermined torque is exceeded, the spring 96 becomes partly wound and swings the flapper valve 80 into an open position. In order to adjust the effect of the coil spring 96 and, as may be seen in FIGURE 5, the lower arm 78 of the connector 76 has an extension 98 to which one end of a tensioning spring 99 is anchored. The other end of the spring 99 is anchored to the short arm of a bell crank lever 100 pivoted as at 101 to the flywheel 68 and frictionally engaging therewith to maintain itself in any adjusted position.

The hollow shaft 93 is provided, at its upper end, see FIGURE 6, with a radial arm 102 to whose outer end there is connected the downturned end of the arm 103 extending radially outwardly from the arm 73 to which it is attached. At its lower end, the hollow shaft 93 has an arm 104 clamped thereto and which has, at its outer end, a downwardly disposed spacer 105 provided with an arm 106 extending radially inwardly with a resilient support 107 at its free end for the upwardly disposed bearing 108 for the pivot 109 at the lower end of the shaft 93. The pivot 70 extends into an axial socket 94ᵃ in the upper end of the shaft 94.

The shaft 94 has a radial arm 110 having a spacer 111 at its outer end supporting a lower arm 112 extending radially inwardly below the arm 106 but is itself disposed to be engaged by the arm 106 on rotation of one shaft relative to the other to a predetermined extent. The arm 112 has a recess 113, see FIGURES 6, 8, and 9, in its lower face to receive the ring 114 which is provided with radially alined grooves 115 to receive the ends of the pivot 116 having pivots 117 disposed at right angles to its axis and connected to the fork 118 of the shaft 119. The ring 114 is resiliently retained in place by the leaf spring 120.

The shaft 119 extends freely through a sleeve 121 threaded into the plate 27 of the base 21 and is locked thereto by a lock nut 122. A collar 123 is clamped to the exposed end of the shaft 119 which includes an eye 124. A spindle 125 of the desired length is connected through the eye 124 and has a member such, for example, as the member 126 which, as it rotates, is subject to the "drag" of the liquid.

While the viscometer 20 may be mounted with its member 126 in the liquid reservoir 130, for ink for example, it is shown in FIGURE 12 as mounted with its member 126 in a sample chamber 131. The ink is delivered from the reservoir 130 by means of a pump 132 whose outlet 133 includes a valve controlled, branch line 134 to the sample chamber 131 from which a discharge line 135 effects the return, by gravity flow, to the reservoir 130. Solvent is delivered from a suitable source, not shown, through a conduit 136 provided with a normally closed valve 137 adapted to be opened by the solenoid 138, when energized.

Changes in the viscosity of the liquid are immediately sensed by the viscometer 20 and in order that the actuation of its flapper valve will effect pneumatically the actuation of the valve 137, there is provided a controller unit, generally indicated at 139, to which air under pressure is delivered from a suitable source through a supply conduit 140 provided with a filter 141 and a pressure regulating valve 142.

In accordance with the invention, it is preferred that not only will the valve 137 be opened whenever the viscosity of the liquid increases beyond a predetermined value and closed when that valve is restored, but also, should the viscosity not stay within a correctable range then signals be operated. For example, and by means presently to be detailed, if the ink in reservoir 130 should become exhausted, an audible signal, the bell 143 and a light source 144, both part of the controller unit 139, are energized, while if the solvent supply fails, then the bell 143 and a light source 145 in the unit 139 are both energized.

In accordance with the invention, the flapper valve opens when the torque reflects an increase in the viscosity of the liquid and controller unit 139 that is then operated will now be detailed and reference is now made to FIGURE 11. The air supply conduit 140 is in communication with a pneumatic control relay 146 and includes a branch line 147 to a supply pressure indicator 148 of a gauge 149, and the branch line conduit 56 to the viscometer 20 and provided with a metering valve 150. A branch line 151 from the conduit 140 includes a control nozzle 152 and a branch 153 to the control relay 146 thereby to deliver air under pressure, as regulated by the pressure reducing tube 154, against one face of a diaphragm 155. The stem 155ᵃ of the diaphragm 155 passes freely through a port 156 in a partition 157 establishing chambers 158 and 159. The stem 155ᵃ has a valve member 160 in the chamber 158 yieldably closing the port 156 under the action of the spring 161 and the chamber 159 is vented as at 162. The partition 157 has a passage 163 effecting communication between the bore 156 and a conduit 164 having a branch 165 to a feedback nozzle 166, a branch 167 in communication with a bellows unit 168, which effects the operation of limit and control switches shown in FIGURE 13, and a branch line 169 is in communication with the output pressure indicator 170 of the gauge 149.

The feedback nozzle 166 is controlled by a flapper valve 171 carried by a shaft 172 in a bracket 173 supported by pivots 174 and yieldably urged upwardly by a spring 175 so that the flapper valve arm 176 also closes the control nozzle 152 when the bracket 173 is under the control of the spring 175, but the control nozzle 152 is opened when the bracket 173 is swung downwardly. The nozzle 170 is located along the axis of the pivots 174 so that it is not affected by movements of the bracket 173.

A U-shaped bracket 177 is pivoted as at 178 and it includes, on one side, a depending lug 179 and an arm 180 provided, at one end, with a pin 181 engageable with the shaft 172 so that when the arm 180 is tilted, its pin 181 is forced downwardly, as viewed in FIGURE 11, thereby forcing the bracket 173 downwardly and uncovering the control nozzle 152.

Opening of the control nozzle 152 is attended by a decrease in the pressure on the diaphragm 155 so that the valve member 160 moves towards its closed position thus decreasing the flow of air to the feedback nozzle 166 enabling the flapper valve 171 to move towards the control nozzle 152 thus to reestablish equilibrium, but having caused the bellows unit 168 to have moved from a first position into a second position in which the control switch is operated until equilibrium is reestablished.

In order that the control, as thus generally described, may respond to the small pressure drop attendant the opening of the flapper valve, the line 56 is provided with a bellows unit 182 which moves in response to the air pressure in the line 56. Such movement of the bellows unit 182 is attended by the swinging of an arm 183 connected by a link 184 to a bell crank lever 185 including a pointer 186. The lever 185 is connected by a link 187 to a bell crank 188 whose other end is connected by a link 189 to the bracket lug 179. By these or equivalent means, slight movements of the bellows unit 182 are attended by appreciable movements of the bracket 177. Associated with the pointer 186 is a pivotable index 190 moves as by a control knob shaft 191 having a gear 192 meshing with a rack 193 arcuate with respect to the pivot 194 of an arm 195 connected by a link 197 to an arm 196 fixed to the index 192.

In FIGURE 13, the circuitry is detailed by which the solenoid 138 of the valve 137 in control of the solvent feed, the bell 143, and the light sources 144 and 145 are appropriately energized or de-energized by pressure changes in the bellows unit 168.

Limit switches 201 and 202 and a control switch 203 are associated with the bellows unit. In one position, when the pressure in the bellows unit 168 is at a minimum, the contacts 204 and 205 are connected to the contact 206. In the other position, when the pressure in the bellows unit 169 is at a maximum, say 15 lb. p.s.i., the contacts 204 and 205 are connected to the contact 207 of the switch 201.

In the position of the switch 202, when the bellows pressure is low, its contacts 208 and 209 are connected to its contact 210 while, when the bellows pressure is high, the contacts 208 and 209 are connected to the contact 211.

The contacts 212 and 213 of the switch 203 are interconnected whenever the viscometer senses the demand for solvent and the contact 212 has a lead 214 provided with a normally open switch 215.

A circuit 216 includes a pair of parallel leads 217 and 218 having the normally open switches 219 and 220, respectively, of a relay 221 which are closed when its coil 222 is energized. The lead 218 includes the solenoid 138 while the lead 217 includes a normally closed switch 223 and is connected to the coil 222 via the lead 224 to which the lead 214 is also connected.

The circuit 216 is also provided with a parallel lead 225 which includes a timer motor 226 connected to a cam 227 by an indicated drive 228 which is operative to close the switch 215 and to open the switch 223 at predetermined intervals, say once every three seconds. Another parallel lead 229 includes the contact 206 of the limit switch 201, the contact 213 of the switch 203, and the contact 211 of the limit switch 202.

From the foregoing, it will be apparent that whenever the viscometer senses a need for solvent, the bellows unit 168 is immediately operative to close the control switch 203 thus energizing the relay coil 222 via the leads 214 and 224 thus to close the relay switches 219 and 220 to energize the solenoid 138 with the lead 217 being also in circuit with the lead 224 to function as a holding circuit and the lead 218 closed with respect to the solenoid 138.

Should the low pressure limit of the bellows unit 168 be reached, then the contacts 204, 205, and 206 of the switch 201 are interconnected as are the contacts 208, 209, and 210 of the limit switch 202. A lead 230 interconnects the leads 204, 205, 208, and 209, while a lead 231 connects the contact 209 to the alarm bell 143 and a lead 232 connects the contact 210 and the light source 145 which then visually indicates that low viscosity limits are reached indicating, for example, ink failure.

Should the high pressure limit be reached by the bellows unit 167, the contacts 204, 205, and 207 of the switch 201 are interconnected as are the contacts 208, 209, and 211 of the limit switch 202. The lead 231 to the bell 143 is, accordingly, in circuit, and the contact 207 has a lead 233 to the light source 144, thus visually to indicate that high viscosity limits prevail indicating, for example, solvent failure.

I claim:

1. In a device for responding to changes in the viscosity of a liquid, a drive shaft, a driven shaft, including a member to be immersed in the liquid to be subjected to the drag thereof, a connection between said shafts operable to permit limited relative rotation therebetween when the driven shaft torque exceeds a predetermined value, a spring one end of which is connected to said driven shaft, and a connection between the other end of said spring and said drive shaft and including an air conduit provided with a valve port carried by said drive shaft, and a port closing member carried by said other spring end and closing said port until relative shaft movement occurs.

2. In a device for responding to changes in the viscosity of a liquid, a drive shaft, a flywheel resiliently connected to said drive shaft, a driven shaft including a member to be immersed in the liquid to be subjected to the drag thereof, a connection between said shafts operable to permit limited relative rotation therebetween when the driven shaft torque exceeds a predetermined value, a spring one end of which is connected to said driven shaft, and a connection between the other end of said spring and said drive shaft and including an air conduit provided with a valve port carried by said drive shaft, and a port closing member carried by said other spring end and closing said port until relative shaft movement occurs.

3. In a device for responding to changes in the viscosity of a liquid, a drive including a drive shaft and a flywheel, an outlet member carried by said drive and provided with an outlet port, means for delivering air to said member while said drive is in operation, a valve member for said port movable relative thereto into and out of a port closing position, a spiral spring connected to said valve member, and first and second driven members rotatable relative to each other, said first driven member being connected to said drive shaft, said second driven member being connected to said spring and including a member to be immersed in the liquid to be subjected to the drag thereof, said spring normally being the driving connection between said drive shaft and said second driven member and then holding said valve member in a first position and said second driven member rotating relative to said first driven member and said drive shaft when the torque exceeds a predetermined value to so affect said spring as to move said valve member into a second position, said first driven member driving said second member on such relative rotation to a predetermined extent.

4. In a device for responding to changes in the viscosity of a liquid, a drive shaft including a flywheel, an outlet member on said flywheel provided with an outlet port, means for delivering air to said member while said fly wheel is rotating, a valve member for said port movable relative thereto into and out of a port closing position and including a connector disposed diametrically with respect to said wheel and having a pivot coaxial with said wheel, a spring connected to the free end of said connector, and first and second driven members rotatable relative to each other, said first driven member being connected to said drive shaft, said second driven member being connected to said spring and including a member to be immersed in the liquid to be subjected to the drag thereof, said spring normally being the driving connection between said drive shaft and said second driven member and then holding said valve member in a first position and said second driven member rotating relative to said first driven member and said drive shaft when the torque exceeds a predetermined value to so affect said spring as to move said valve member into a second position, said first driven member driving said second driven member on such rotation to a predetermined extent.

5. In a device for responding to changes in the viscosity of a liquid, a drive shaft including a flywheel, an outlet member on said flywheel having an outlet port, means for delivering air to said member while said flywheel is rotating, a valve member for said port movable relative thereto into and out of a port closing position, a spring connected to said valve member, and first and second driven members rotatable relative to each other, said first driven member including a tubular portion and said second driven member including a portion extending therethrough, said first driven member being connected to said spring and including a member to be immersed in the liquid to be subjected to the drag thereof, said spring normally being the driving connection between said drive shaft and said second driven member and then holding said valve member in a first position and second driven member rotating relative to said first driven member and said drive shaft when the torque exceeds a predetermined value to so affect said spring as to move said valve member into a second position, said first and second driven members also including portions interengaging on such rotation to a predetermined extent and said first driven member driving said second driven member on such interengagement.

6. In a device for responding to changes in the viscosity of a liquid, a drive shaft including a flywheel, an outlet member on said flywheel provided with an outlet port, means for delivering air to said member while said flywheel is rotating, a valve member for said port movable relative thereto into and out of a port closing position, a spring connected to said valve member, a support and first and second driven members rotatable relative to each other, said first driven member including a tubular portion journalled on said support and said second driven member including a portion extending freely through said tubular portion, said first driven member being connected to said drive shaft, said second driven member being connected to said spring and including a member to be immersed in the liquid to be subjected to the drag thereof, said spring normally being the driving connection between said drive shaft and said second driven member and then holding said valve member in a first position and said second driven member rotating relative to said first driven member and to said drive shaft when the torque exceeds a predetermined value to so affect said spring as to move said valve member into a second position, each of said driven members including a U-shaped portion, each providing an upper and a lower arm interconnected at their outer ends, the upper arm of the portion of the second driven member being at the lower end thereof, and the lower arm of the first driven member being disposed between the arms of said second driven member and including a bearing rotatably supporting the lower end of said second driven member; said portions interengaging on rotation of said second driven member relative to said first driven member to a predetermined extent and thereafter being driven thereby.

7. The device of claim 6 in which the bearing of the U-shaped portion of the first driven member has a resilient connection with the lower arm thereof.

8. In a device for responding to changes in the viscosity of a liquid, a drive shaft including a flywheel, an outlet member of said flywheel provided with an outlet port, means for delivering air to said member while said flywheel is rotating, a valve member for said port movable relative thereto into and out of a port closing position, a spring connected to said valve member, a support and first and second driven members rotatable relative to each other, said first driven member including a tubular portion journalled on said support and said second driven member including a portion extending freely through said tubular portion, said first driven member being connected to said drive shaft, said second driven member being connected to said spring, said spring normally being the driving connection between said drive shaft and said second driven member and then holding said valve member in a first position and said second driven member rotating relative to said first driven member and to said drive shaft when the torque exceeds a predetermined value to so affect said spring as to move said valve member into a second position, each of said driven members including a U-shaped portion, each providing an upper and a lower arm interconnected at their outer ends, the upper arm of the portion of the second driven member being at the lower end thereof, and the lower arm of the first driven member being disposed between the arms of said second driven member and including a bearing rotatably supporting the lower end of said second driven member; said portions interengaging on rotation of said second driven member relative to said first driven member to a predetermined extent and thereafter being driven thereby, a driven shaft, and including a member to be immersed in the liquid to be subjected to the drag thereof, and a universal joint connecting said driven shaft to the lower arm of the U-shaped portion of the second driven member.

9. The device of claim 8 in which the lower arm of the U-shaped portion of the second driven member has a resilient support for the universal joint.

10. In a device for responding to changes in the viscosity of a liquid, a drive shaft including a flywheel having openings and provided with spindle ends, an outlet member on said flywheel provided with an outlet port, means for delivering air to said member while said flywheel is rotating, a valve member for said port movable relative thereto into and out of a port closing position, a spring connected to said valve member, and first and second driven members rotatable relative to each other, a U-shaped member providing upper and lower arms interconnected at their outer ends through an opening in the flywheel, the upper arm being connected to said drive shaft, said first driven member being connected to the lower arm of said U-shaped member, said spindle ends being rotatably supported by the arms of said U-shaped member, said second driven member being connected to said spring and including a member to be immersed in the liquid to be subjected to the drag thereof, said spring normally being the driving connection between said drive shaft and said second driven member and then holding said valve member in a first position and said second driven member rotating relative to said first driven member and to said drive shaft when the torque exceeds a predetermined value to so affect said spring as to move said valve member into a second position.

11. In a device for responding to changes in the viscosity of a liquid, a drive shaft including a flywheel having openings and provided with spindle ends, an outlet member on said flywheel provided with an outlet port, means for delivering air to said member while said flywheel is rotating, a valve member for said port movable relative thereto into and out of a port closing position and a connector including upper and lower arms rotatably supported by said spindle ends and interconnected through a flywheel opening, said valve member being connected to the outer end of said upper arm, said connector arms being disposed diametrically with respect to said flywheel, a spring connected to the outer end of said lower connector arm, and first and second driven members rotatable relative to each other, a U-shaped member providing upper and lower arms interconnected at their outer ends through an opening in the flywheel, the upper arm being connected to said drive shaft, said first driven member being connected to the lower arm of said U-shaped member, said spindle ends being rotatably supported by the arms of said U-shaped member, said second driven member being connected to said spring and including a member to be immersed in the liquid to be subjected to the drag thereof, said spring normally being the driving connection between said drive shaft and said second driven member and then holding said valve member in a first position and said second driven member rotating relative to said first driven member and to said drive shaft when the torque exceeds a predetermined value to so affect said spring as to move said valve member into a second position.

12. In a device for responding to changes in the viscosity of a liquid, a hollow drive shaft including a flywheel, an outlet member on said flywheel provided with an outlet port and in communication with the interior of said shaft, means for delivering air into the upper end of said shaft while it is rotating, a valve member for said port movable relative thereto into and out of a port closing position, a spring connected to said valve member, and first and second driven members rotatable relative to each other, said first driven member connected to said drive shaft, said second driven member being connected to said spring and including a member to be immersed in the liquid to be subjected to the drag thereof, said spring normally being the driving connection between said drive shaft and said second driven member and then holding said valve member in a first position and said second driven member rotating relative to said first driven member when the torque exceeds a predetermined value to so affect said spring as to move said valve member into a second position, said driven member interengaging on such rotation to a predetermined extent and then said first driven member driving said second driven member.

13. The device of claim 12 in which the means for delivering air into the hollow shaft comprises an air supply conduit including a nozzle rotatably entrant of the upper end of the shaft, and a resilient member yieldably holds the nozzle seated.

14. In a device for responding to changes in the viscosity of a liquid, a drive shaft including a flywheel having an opening, an outlet member on said flywheel provided with an outlet port, means for delivering air to said member while said flywheel is rotating, a connection disposed diametrically with respect to said wheel and pivoted coaxially but pivoting independntly thereof, a valve member for said port movable relative thereto into and out of a port closing position and connected to one end of said connector, a spring connected to the other end of said connector, and adjustable resilient means carried by said wheel and yieldably opposing movement of said connector, and first and second driven members rotatable relative to each other, said first driven member being connected to said drive shaft, said second driven member being connected to said spring and including a member to be immersed in the liquid to be subjected to the drag thereof, said spring normally being the driving connection between said drive shaft and said second driven member and then holding said valve member in a first position, said second driven member rotating relative to said first driven member when the torque exceeds a predetermined value to so affect said spring as to move said valve member into a second position, said driven members interengaging on such rotation to a predetermined extent and then said first driven member driving said second driven member.

15. In a device for responding to changes in the viscosity of a liquid, a drive shaft, a flywheel, a resilient and yieldable driving connection between said shaft and said flywheel, an outlet member on said flywheel provided with an outlet port, means for delivering air to said member while said flywheel is rotating, a valve member for said port movable relative thereto into and out of a port closing position, a drive shaft, a spring connected to said valve member, and first and second driven members rotatable relative to each other, said first driven member being connected to said drive shaft, said second driven member being connected to said spring and including a member to be immersed in the liquid to be subjected to the drag thereof, said spring normally being the driving connection between said drive shaft and said second driven member and then holding said valve member in a first position, said second driven member rotating relative to said first driven member when the torque exceeds a predetermined value to so affect said spring as to move said valve member into a second position, said driven members interengaging on such rotation to a predetermined extent and then said first driven member driving said second driven member.

16. In a device for responding to changes in the viscosity of a liquid, a drive shaft, a flywheel, an outlet member on said flywheel provided with an outlet port, and being adjustable towards or away from the rim of said wheel, means for delivering air to said member while said flywheel is rotating, a valve member for said port movable relative thereto into and out of a port closing position, a drive shaft, a spring connected to said valve member, and first and second driven members rotatable relative to each other, said first driven member being connected to said drive shaft, said second driven member being connected to said spring and including a member to be immersed in the liquid to be subjected to the drag thereof, said spring normally being the driving connection between said drive shaft and said second driven member and then holding said valve member in a first position, said second driven member rotating relative to said first driven member when the torque exceeds a predetermined value to so affect said spring as to move said valve member into a second position, said driven members interengaging on such rotation to a predetermined extent and then said first driven member driving said second driven member.

17. In a device for responding to changes in the viscosity of a liquid, a drive shaft, a driven shaft axially alined therewith but spaced therefrom and including a member to be immersed in the liquid to be subjected to the drag thereof, a connection between said shafts operable to permit limited relative rotation therebetween when the driven shaft torque exceeds a predetermined value, a spring one end of which is connected to said driven shaft, and a connection between the other end of said spring and said drive shaft and including an air conduit provided with a valve port carried by said drive shaft, and a port closing member carried by said other spring end and closing said port until relative shaft movement occurs, said port closing member being between the proximate ends of said shafts and pivotally supported thereby.

18. In a device for responding to changes in the viscosity of a liquid, a drive shaft axially aligned therewith but spaced therefrom, a flywheel pivotally supported by said shaft and resiliently connected thereto, a driven shaft including a member to be immersed in the liquid to be subjected to the drag thereof, a connection between said shafts operable to permit limited relative rotation therebetween when the driven shaft torque exceeds a predetermined value, a spring one end of which is connected to said driven shaft, and a connection between the other end of said spring including an air conduit provided with a valve port carried by said flywheel, and a port closing member carried by said other spring end and closing said port until relative shaft movement occurs, said port closing member being between the proximate ends of said shafts and pivotally supported thereby, both connections being independent of said flywheel during said relative shaft movement.

19. In a device for responding to changes in the viscosity of a liquid, a drive shaft, a driven shaft including a member to be immersed in the liquid to be subject to the drag thereof, a connection betwen said shafts operable to permit relative rotation therebetween when the driven shaft torque exceeds a predetermined value, a spring, one end of said spring being connected to said driven shaft, a connection between the other end of said spring and said drive shaft and including a conduit provided with a valve port carried by said drive shaft, and a port closing member carried by said other spring end and controlling said port until relative movement between the shafts occurs, a pressure-operated unit, a supply of fluid under a predetermined pressure including a pair of conduits, one in communication with said unit and the other in communication with said valve port, and a throttling device interposed between said supply and said conduits, said unit operating throughout the range of pressure in said conduits as determined by said port closing member.

References Cited in the file of this patent
UNITED STATES PATENTS

| | | |
|---|---|---|
| 2,679,750 | Brookfield | June 1, 1954 |
| 2,772,605 | Schlapak | Dec. 4, 1956 |
| 2,917,065 | Monk | Dec. 15, 1959 |